Patented May 15, 1945

2,375,804

UNITED STATES PATENT OFFICE 2,375,804

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application December 16, 1942, Serial No. 469,218

3 Claims. (Cl. 260—198)

This invention or discovery relates to new azo compounds and their application to the art of dyeing or coloring.

It is an object of our invention to provide new azo compounds highly useful as dyes. A further object of our invention is to provide non-vegetable textile material colored with the new azo compounds of our invention. Another object is to provide a satisfactory process for the preparation of the new azo compounds of our invention. A further object is to provide organic derivative of cellulose textile material colored with the new azo compounds of the invention. A particular object is to provide cellulose acetate textile material colored with the new azo compounds of the invention.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The new azo compounds of our invention, by means of which the above objects are accomplished or made possible, have the formula:

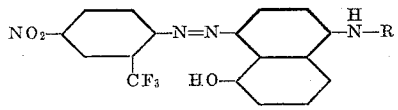

wherein R stands for a member selected from the group consisting of a 2,3-dihydroxy-n-propyl group and a 2,3-dihydroxy-2-methyl-n-propyl group.

The azo dye compounds of our invention yield greenish-blue colors. They are particularly of value for the dyeing of organic derivative of cellulose textile materials especially cellulose acetate textile materials. They can also be used to color other non-vegetable textile materials such as wool, silk and nylon. Cellulose ester and cellulose ether lacquers, as well as lacquers from vinyl derivatives also can be colored.

In the past it has been very difficult to obtain azo dyes which color cellulose acetate greenish-blue shades fast to light and even more so to find azo dyes that are both fast to light and dischargeable to a pure white. The new azo dyes of our invention overcome this difficulty because with them cellulose acetate can be colored greenish-blue shades which are fast to light and which are easily dischargeable to a pure white. Of the two dye compounds of our invention the one containing a 2,3-dihydroxy-2-methyl-n-propyl group yields greener dyeings and dyeings which are faster to burnt gas fumes. The dyeings may be discharged to a clear white with discharging agents such as sodium hydrosulfite and sodium formaldehyde sulfoxylate.

The following examples illustrate the preparation of the compounds of our invention:

Example 1

1 gram mole of 2-amino-5-nitrotrifluoromethylbenzene is diazotized in acetic acid with nitrosyl sulfuric acid. The temperature of the reaction mixture during the diazotization reaction is kept at 0–5° C. by external cooling. Excess nitrous acid present in the reaction mixture is destroyed by adding urea and the diazonium solution is then poured onto ice. The diazonium solution is then added to an acetic acid solution of 1 gram mole of 1-(2,3-dihydroxy-n-propylamino)-5-hydroxynaphthalene and the coupling reaction which takes place is completed by adding sodium acetate until the reaction mixture is neutral to Congo red paper. It will be understood, of course, that throughout the coupling reaction, the reaction mixture is maintained in a cooled condition such as 0–10° C. Water is added to the reaction mixture and the precipitated dye is recovered by filtration, washed with water and dried. The dye compound obtained has the formula:

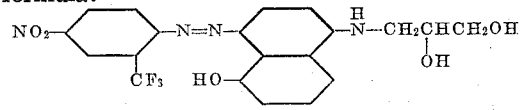

It colors cellulose acetate greenish-blue shades fast to light which are easily dischargeable to a pure white.

If desired, the coupling reaction can be carried out in a hydrochloric acid solution obtained by dissolving 1-(2,3-dihydroxy-n-propylamino)-5-hydroxynaphthalene in its hydrochloride salt form in water.

Example 2

1 gram mole of 2-amino-5-nitro-trifluoromethylbenzene is diazotized in acetic acid with nitrosylsulfuric acid. Any excess nitrous acid present in the reaction mixture is destroyed by adding urea following which the diazonium solution is poured onto ice to effect dilution of the reaction mixture. The diazotization reaction is carried out while maintaining the reaction mixture in a cooled condition with external cooling.

The diazonium solution prepared as described above is then added to a cooled solution of 1 gram mole of 1-(2,3-dihydroxy-2-methyl-n-propylamino)-5-hydroxynaphthalenehydrochloride in water and the coupling reaction which takes place is completed by adding sodium acetate until the reaction mixture is neutral to Congo red paper. Water is then added to the reaction mixture and the precipitated dye is recovered by filtration, washed with water and dried. The dye compound obtained has the formula:

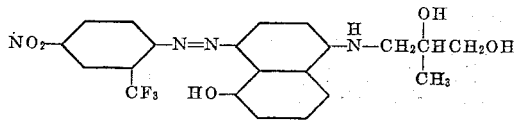

It colors cellulose acetate greenish-blue shades fast to light which are easily dischargeable to a pure white.

In order that our invention may be clearly understood, the preparation of 1-(2,3-dihydroxy-n-propylamino)-5-hydroxynaphthalene and 1-(2,3-dihydroxy-2-methyl - n - propylamino)-5-hydroxynaphthalene are described hereinafter.

*Preparation of 1-(2,3-dihydroxy-n-propylamino)-5-hydroxynaphthalene*

149 grams of 1-amino-5-naphthol are placed in a one-liter flask fitted with a mechanical stirrer, a gas inlet tube and a gas outlet tube. To the flask is then added 92.5 grams of sodium bicarbonate, 121 grams of glycerolchlorohydrin and 200 cc. of amyl alcohol. The reaction mixture is heated to boiling for 5 hours and during the reaction an inert gas such as nitrogen or carbon dioxide is bubbled through the reaction mixture. The dark reaction mixture is then poured into water and made acid to litmus with hydrochloric acid. Amyl alcohol is separated from the reaction mixture and the reaction product is dissolved by heating, treated with activated charcoal, filtered and allowed to crystallize by cooling. By this procedure the desired product is obtained quite purely in the form of its hydrochloride salt. The hydrochloride salt form is prepared because it is much more stable to air than the free base form. If desired, the sulfate salt form could be obtained by substituting sulfuric acid for hydrochloric acid in the above procedure. Should the free base form be desired for any reason, it can be obtained by neutralizing the acid salt form with sodium bisulfite, for example.

*Preparation of 1-(2,3-dihydroxy-2-methyl-n-propylamino)-5-hydroxynaphthalene*

This compound can be prepared following the procedure described in connection with the preparation of 1-(2,3-dihydroxy-n-propylamino)-5-hydroxynaphthalene by substituting 1 gram mole of mono-β-methylglycerylchlorohydrin for glycerylchlorohydrin.

The new monoazo dye compounds of our invention can be applied to cellulose acetate textile materials by the well known dispersion method. In this method the dye and soap or other suitable dispersing agent in finely divided uniform admixture are mixed with water to form a dyebath in which the material to be dyed is immersed, the dyeing operation being carried out at a suitable temperature until complete. This method of dyeing is so familiar to those skilled in the art to which this invention is directed that any further discussion of it is unnecessary. It is described more fully in our U. S. Patent 2,108,824, issued February 22, 1938. Somewhat lower temperatures than mentioned in the patent can be employed.

The other textile materials named herein can be dyed by the same method as that described or by any other suitable method known for their coloration. Again, while our invention has been described more particularly in connection with the dyeing of cellulose acetate, it will be understood that our new compounds yield generally similar shades on the other non-vegetable textile materials named herein as they do on cellulose acetate. Lacquers can be colored by the method customarily employed for the coloration of such materials. The exact manner of dyeing or coloring, of course, constitutes no part of our invention.

It is here noted that the term "nylon" refers to a nuclear polyamide resin which is believed to be basically described or claimed in U. S. Letters Patent No. 2,071,250, issued February 16, 1937, to Wallace H. Carothers.

We are aware that U. S. Patent 2,194,927, issued March 26, 1940, to Daudt et al., discloses in Example 3 the azo dye prepared from diazotized 2-amino-3,5-dinitrotrifluoromethylbenzene and 1-β-hydroxyethylamino - 5 - hydroxynaphthalene. The dye compounds of our invention or discovery, however, are much superior to this dye in that they have a substantially greater affinity for cellulose acetate fabrics and in that dyeings obtained thereon by applying them to the fabric from their aqueous dispersions, for example, under identical conditions are much improved with respect to light fastness. Similarly, the dye compounds of our invention or discovery are noticeably superior, for example, in the respects just noted, to the dye compound obtained by coupling diazotized 2-amino-3,5-dinitrotrifluoromethylbenzene with 1-(2,3-dihydroxy-n-propylamino)-5-hydroxynaphthalene or to the dye compound obtained by coupling diazotized 2-amino-5-nitrotrifluoromethylbenzene with 1-β-hydroxyethylamino-5-hydroxynaphthalene. So far as we are aware, the dye compounds of our invention or discovery constitute a new class of dye compounds which possess unusually good dyeing properties. Their superior dyeing properties which make them of importance for the coloration of the materials noted hereinbefore, especially cellulose acetate, could not have been predicted from the prior art.

We claim:

1. The azo compounds having the formula:

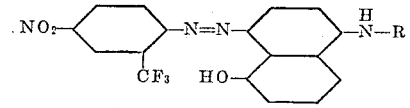

wherein R stands for a member selected from the group consisting of a 2,3-dihydroxy-n-propyl group and a 2,3-dihydroxy-2-methyl-n-propyl group.

2. The azo compound having the formula:

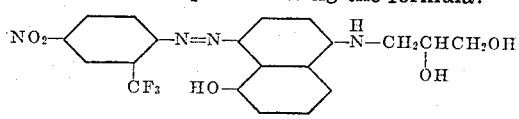

3. The azo compound having the formula:

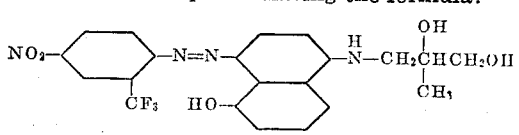

JAMES G. McNALLY.
JOSEPH B. DICKEY.